(12) United States Patent
Sanderson et al.

(10) Patent No.: US 7,842,121 B2
(45) Date of Patent: Nov. 30, 2010

(54) SYSTEM AND METHOD FOR PROVIDING AQUEOUS STREAM PURIFICATION SERVICES

(75) Inventors: Larry D. Sanderson, Roswell, GA (US); James W. Schleiffarth, Midway, UT (US); Leslie D. Merrill, Bountiful, UT (US); Bradford M. Rohwer, Bountiful, UT (US)

(73) Assignee: General Electric Capital Corporation, Stampford, CT (US)

( * ) Notice: Subject to any disclaimer, the term of this patent is extended or adjusted under 35 U.S.C. 154(b) by 1 day.

(21) Appl. No.: 12/199,779

(22) Filed: Aug. 27, 2008

(65) Prior Publication Data

US 2009/0082906 A1    Mar. 26, 2009

Related U.S. Application Data

(60) Provisional application No. 60/968,285, filed on Aug. 27, 2007.

(51) Int. Cl.
*B01D 19/00* (2006.01)

(52) U.S. Cl. .......................... 95/1; 95/8; 95/14; 95/23; 95/24; 95/39; 95/168; 95/169; 95/179; 95/245; 95/251; 96/156; 96/173; 96/218; 96/242; 96/244; 96/251; 96/252; 96/420; 96/422; 208/187; 210/85; 210/96.1; 210/103; 210/134; 210/149; 210/180; 210/182; 210/195.1; 210/259; 210/739; 210/774; 210/805; 210/806; 202/161; 202/185.1; 202/182; 202/197; 203/28; 203/39; 165/108

(58) Field of Classification Search ............... 210/85, 210/87, 96.1, 134, 143, 149, 1, 167.06, 257.1, 210/259, 669, 739, 744, 747, 771–774, 787, 210/806, 103, 180–182, 195.1, 805; 95/1, 95/8, 23, 24, 39, 42, 156–169, 187, 251, 95/252, 254, 259, 263, 266, 178–180, 186, 95/188, 204, 223–228, 241–245; 96/155–157, 96/193, 218, 219; 202/82–85, 152, 176, 202/181, 182; 203/1–3, 10, 39, 41, 91, 98; 700/28, 32, 33, 266, 270, 273–275, 282, 700/299; 208/187; 165/108
See application file for complete search history.

(56) References Cited

U.S. PATENT DOCUMENTS

| | | | |
|---|---|---|---|
| 3,923,644 A * | 12/1975 | Hindman | 208/186 |
| 4,341,636 A | 7/1982 | Harder et al. | |
| 4,539,076 A | 9/1985 | Swain | |
| 4,834,889 A | 5/1989 | Schleiffarth | |
| 5,587,054 A | 12/1996 | Keith | |
| 5,645,694 A | 7/1997 | Stewart et al. | |
| 6,015,496 A | 1/2000 | Khudenko | |
| 6,217,711 B1 | 4/2001 | Ryham et al. | |
| 6,355,145 B1 | 3/2002 | Kresnyak et al. | |
| 6,365,005 B1 | 4/2002 | Schleiffarth | |
| 6,536,523 B1 | 3/2003 | Kresnyak et al. | |
| 6,551,466 B1 | 4/2003 | Kresnyak et al. | |
| 6,849,175 B2 * | 2/2005 | Kresnyak | 208/187 |
| 6,944,522 B2 * | 9/2005 | Karmiy et al. | 700/273 |
| 6,984,292 B2 | 1/2006 | Kresnyak et al. | |
| 7,002,140 B2 | 2/2006 | Elsegood et al. | |
| 2003/0127400 A1 | 7/2003 | Kresnyak | |
| 2004/0206681 A1 * | 10/2004 | Gordon | 210/259 |
| 2007/0051513 A1 | 3/2007 | Heins | |
| 2007/0102359 A1 * | 5/2007 | Lombardi et al. | 210/639 |
| 2009/0032446 A1 * | 2/2009 | Wiemers et al. | 210/85 |

OTHER PUBLICATIONS

PCT/US08/74516 International Search Report and Written Opinion, Nov. 19, 2008.

PCT/US08/74518 International Search Report and Written Opinion, Nov. 17, 2008.
PCT/US08/74516 International Preliminary Report on Patentability, Apr. 20, 2010.
PCT/US08/74518 International Preliminary Report on Patentability, Mar. 22, 2010.

* cited by examiner

*Primary Examiner*—Joseph W Drodge
(74) *Attorney, Agent, or Firm*—Kunzler Needham Massey & Thorpe

(57) ABSTRACT

A system and method are disclosed for providing aqueous stream purification services. The system includes at least one separation unit. Each separation unit may include a mechanical vapor recompression separator, a steam stripper, and a secondary recovery heat exchanger. The system for wastewater purification may receive water from a waste water storage, purify the water, and return the purified water to a purified water storage. The system may include a controller. The controller may include an operating conditions module configured to interpret at least one operating condition. Operating conditions may be waste fluid stream impurity concentrations, waste fluid stream flow rates, steam inlet temperatures, recirculation stream flow rates corresponding to the at least one separation unit, recirculation stream temperatures corresponding to the at least one separation unit, purified product stream flow rates, purified product stream impurity concentrations, and/or purge stream concentrations corresponding to the at least one separation unit.

21 Claims, 8 Drawing Sheets

SYSTEM AND METHOD FOR PROVIDING AQUEOUS STREAM PURIFICATION SERVICES

CROSS-REFERENCES TO RELATED APPLICATIONS

This application claims the benefit of U.S. Provisional Patent Application No. 60/968,285 entitled "APPARATUS, SYSTEM, AND METHOD FOR PROVIDING AQUEOUS STREAM PURIFICATION SERVICES" and filed on Aug. 27, 2007, for Larry D. Sanderson, et. al which is incorporated herein by reference. The application incorporates by reference U.S. Provisional Application Ser. No. 60/968,284 filed Aug. 27, 2007.

BACKGROUND OF THE INVENTION

1. Field of the Invention

This invention relates to waste stream purification, and more particularly relates to purification of waste streams containing contaminants typically found in oilfield applications.

2. Description of the Related Art

Water is often used for various tasks in the oil and gas industry. For example, water may be injected into a well to repressurize a reservoir, and water may be pumped from a well in the process of extracting oil or gas. As another example, water may used to deliver proppants to underground fractures. Due to environmental concerns, contaminated water cannot simply dumped on the ground or pumped back into wells. The requirement to treat contaminated water sources presents an additional operation and expense for oil and gas well owners and operators.

Treating waste water typically involves one or more unit operations, such as distillation or filtration. Distillation is an energy-intensive process that frequently requires large distillation columns. Filtration may require frequent filter changes to keep the system operating at the desired contaminant removal levels. The oil or gas producer must have personnel on hand to operate the waste water treatment unit operations, and must have the required energy and materials available to process the produced waste water. All of these constraints cost money and increase the cost of oil and gas production.

SUMMARY OF THE INVENTION

From the foregoing discussion, it should be apparent that a need exists for a system and method that provides aqueous stream purification services. Beneficially, such a system and method would provide oil and gas producers a more efficient way to process waste water. Such a system and method would provide a source of clean water for use in further well operations, for human and agricultural needs, or for reinjection into the ground. Further, such a system and method could be used to process waste water in settings other than the petroleum industry. The system and method could be used when circumstances call for a self-contained purification system.

In one embodiment, the invention is a system to provide waste water purification services. The system includes at least one separation unit. Each separation unit may include a mechanical vapor recompression separator, a steam stripper, and a secondary recovery heat exchanger. The system for wastewater purification may receive water from a waste water storage, purify the water, and return the purified water to a purified water storage.

In a further embodiment, the system includes a controller. The controller may include an operating conditions module configured to interpret at least one operating condition. Operating conditions may be waste fluid stream impurity concentrations, waste fluid stream flow rates, steam inlet temperatures, recirculation stream flow rates corresponding to the at least one separation unit, recirculation stream temperatures corresponding to the at least one separation unit, purified product stream flow rates, purified product stream impurity concentrations, and/or purge stream concentrations corresponding to the at least one separation unit.

The controller may include a user request module configured to interpret at least one user request. User requests may be purified product stream flow rate requests, purified product stream impurity concentration requests, inlet steam flow rate requests, purge stream concentration requests corresponding to the at least one separation unit, waste fluid stream flow rate requests, steam stripper reflux ratio requests, purge stream temperature requests corresponding to the at least one separation unit, purified water storage level requests, waste water storage level requests, evaporation unit fluid level requests, system pressure parameters, and/or stripping vessel fluid level requests.

The controller may include a process control module. The process control module may be configured to generate at least one system response based on the at least one operating condition, in response to the at least one user request. The controller may also include an actuation module configured to control at least one actuator based on the system response.

In one embodiment of the system of the present invention, the at least one system response includes a purge stream valve position, a recirculation stream valve position, a steam inlet valve position, a recirculation pump power output, a final product stream valve position, a reflux valve position, a waste fluid stream valve position, a feed pump power output, a stripper recycle pump power output, and/or a pre-heated feed stream valve position. The controller may be distributed over a plurality of computers, and the plurality of computers may communicate over a network. The user request module may interpret the at least one user request by receiving the at least one user request over a network. The controller may also include a monitoring module configured to provide one of the at least one operating conditions to a user display.

The system to provide waste water purification services may be configured with a single inlet connection for waste water and a single outlet connection for purified water. The system to provide waste water purification services may be configured to fit on a single standard commercial vehicle.

The mechanical vapor recompression separator, the steam stripper, and the secondary recovery heat exchanger may comprise modules configured to assemble together. Each of the modules may be configured to fit on a single standard commercial vehicle.

The system may include a waste water storage and a purified water storage. The system typically includes an application utilizing water from the purified water storage, and disposing of the utilized water into the waste water storage.

One embodiment of the current invention is a method to provide waste water purification services. The method includes receiving a waste water stream from a waste water storage, separating impurities from the waste water stream in at least one separation unit, and returning a purified water stream to a purified water storage. Each separation unit may include a mechanical vapor recompression separator, a steam stripper, and a secondary recovery heat exchanger. The method may also include interpreting at least one operating condition. The operating conditions may include waste fluid stream impurity concentrations, waste fluid stream flow rates, steam inlet temperatures, recirculation stream flow rates corresponding to the at least one separation unit, recirculation stream temperatures corresponding to the at least one separation unit, purified product stream flow rates, purified product stream impurity concentrations, and purge stream concentrations corresponding to the at least one separation unit.

The method may also include interpreting at least one user request. The user requests may include purified product stream flow rate requests, purified product stream impurity concentration requests, inlet steam flow rate requests, purge stream concentration requests corresponding to the at least one separation unit, waste fluid stream flow rate requests, steam stripper reflux ratio requests, purge stream temperature requests corresponding to the at least one separation unit, purified water storage level requests, waste water storage level requests, evaporation unit fluid level requests, system pressure parameters, and/or stripping vessel fluid level requests.

The method may also include generating at least one system response based on the at least one operating condition, in response to the at least one user request and controlling at least one actuator based on the system response. The at least one system response may be selected from the group consisting of a purge stream valve position, a recirculation stream valve position, a steam inlet valve position, a recirculation pump power output, a final product stream valve position, a reflux valve position, a waste fluid stream valve position, a feed pump power output, a stripper recycle pump power output, and a pre-heated feed stream valve position. The at least one user request may be received over a network. The at least one actuator may be controlled over a network.

The method may also include providing the at least one operating condition to a user display. In certain embodiments, the method includes using water from the purified water storage in an application and disposing of water from an application into the waste water storage.

In one embodiment, the invention is a computer program product. The computer program product may include a computer readable medium having computer usable program code programmed to execute a method of providing waste water purification services. The method may include interpreting at least one operating condition, interpreting at least one user request, generating at least one system response, and controlling at least one actuator based on the at least one system response. Interpreting the at least one operating condition may include one or more of reading parameters from a datalink, interpreting sensor input values, and calculating operating conditions based on other detected parameters. The at least one user request typically includes a target value for a parameter in a waste water purification system. A user may include one or more of a person, a computer, and a system in communication with a controller. The at least one system response may be based on the at least one operating condition and the at least one system response may be in response to the at least one user request.

In a further embodiment, the user request is selected from the group consisting of a purified product stream flow rate request, a purified product stream impurity concentration request, an inlet steam flow rate request, a purge stream concentration request corresponding to the at least one separation unit, a waste fluid stream flow rate request, a steam stripper reflux ratio request, a purge stream temperature request corresponding to the at least one separation unit, a purified water storage level request, a waste water storage level request, an evaporation unit fluid level request, a system pressure parameter, and a stripping vessel fluid level request.

The at least one operating condition may be selected from the set of conditions consisting of a waste fluid stream impurity concentration, a waste fluid stream flow rate, a steam inlet temperature, a recirculation stream flow rate corresponding to the at least one separation unit, a recirculation stream temperature corresponding to the at least one separation unit, a purified product stream flow rate, a purified product stream impurity concentration, and a purge stream concentration corresponding to the at least one separation unit.

The at least one system response may include a system response selected from the group consisting of a purge stream valve position, a recirculation stream valve position, a steam inlet valve position, a recirculation pump power output, a final product stream valve position, a reflux valve position, a waste fluid stream valve position, a feed pump power output, a stripper recycle pump power output, and a pre-heated feed stream valve position.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
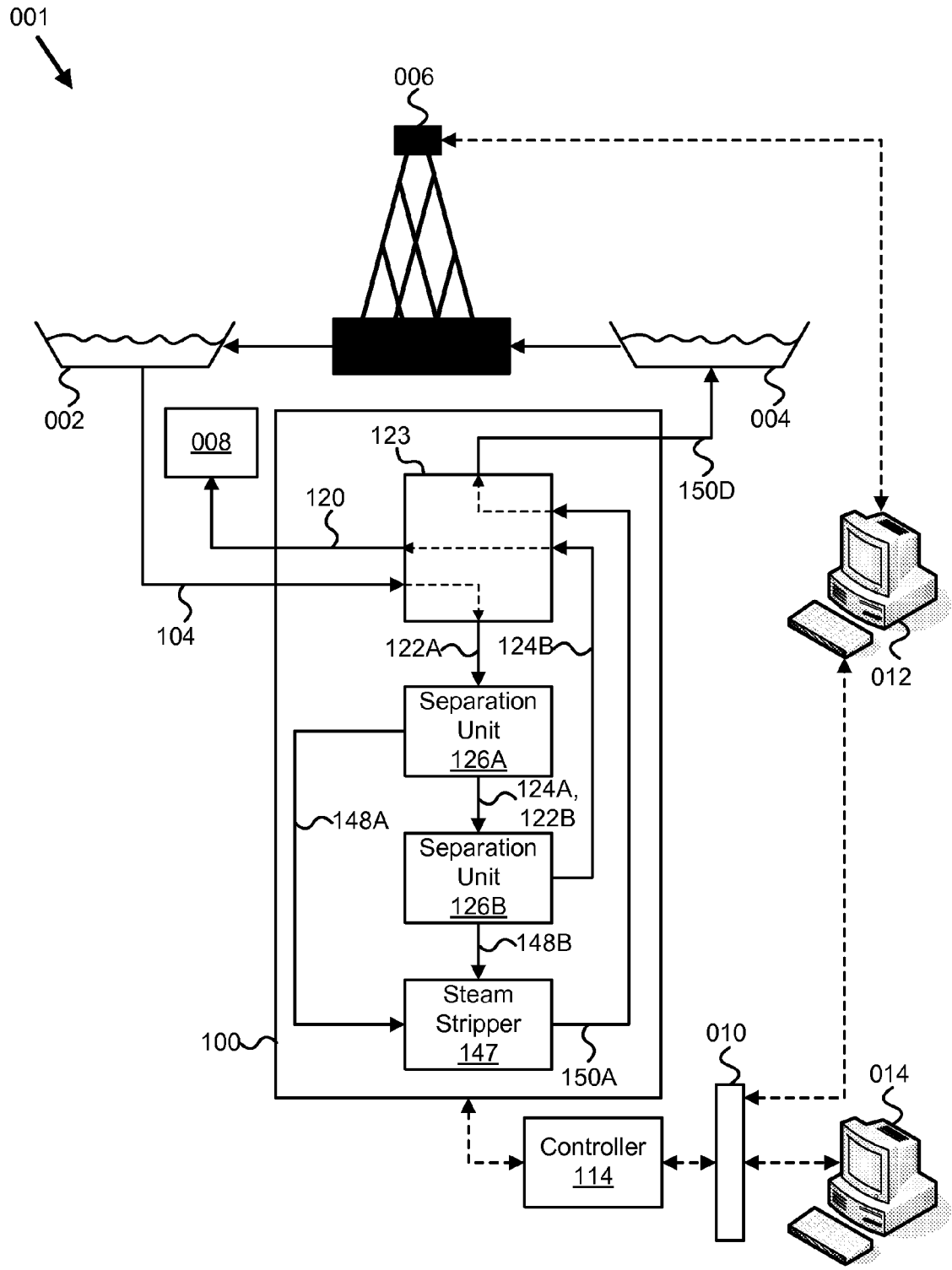
FIG. 1A is a schematic block diagram illustrating one embodiment of a system to provide waste water purification services in accordance with the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 6B, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

FIG. 1A is a schematic block diagram illustrating one embodiment of a system 001 to provide waste water purification services in accordance with the present invention. The system 001 includes a waste water storage 002 and a purified water storage 004. The waste water storage 002 may be any storage vessel that can store water having a contaminant and/or impurity, for example a lined pit. The waste water storage 002 may be a pit storing completion fluids from an oil well, such as fracturing fluids.

The system 001 further includes an application 006 utilizing water from the purified water storage 004, and disposing of the utilized water into the waste water storage 002. In one embodiment, the application 006 may be a drilling rig and/or a completion rig. The system 001 further includes a separation system 100 for waste water purification. The separation system 100 includes at least one separation unit 126A, 126B, where each separation unit has a mechanical vapor separator that separates contaminants from the waste water. The separation system 100 further includes a steam stripper 147 that removes volatile fractions, including volatile organic compounds such as methanol, to complete the water purification. The volatile fractions and any non-condensable vapors may be vented and/or stored (not shown). The separation system 100 further includes a secondary recovery heat exchanger 123 that recovers heat from the purified product stream 150A and from the concentrated purge stream 120. The separation system 100 receives a waste fluid stream 104 and discharges a purified product stream 150D. The separation system 100 further discharges a concentrated purge stream 120, in one embodiment to a purge storage vessel 008.

The separation units 126A, 126B are arranged in a series configuration, wherein the concentrated purge stream 124A from the first separation unit 126A becomes a feed stream 122B for the second separation unit 126B. The removal of impurities may be balanced between the separation units 126A, 126B in any desired fashion—for example such that the recirculation streams, the distillate streams, and/or the energy inputs into each separation unit 126A, 126B are similar. In one embodiment, the separation units 126A, 126B are configured such that the amount of condensed distillate 148A, 148B removed from the waste fluid stream 104 in each separation unit 126A, 126B is similar. In one example, the waste fluid stream 104 comprises 1,000 ppm of an impurity at a mass flow rate of 100 kg/min, where the final concentrated purge stream 124B is designed to be at 100,000 ppm of the impurity. In the example, the first concentrated purge stream 124A may be about 50 kg/min with an impurity level of about 2,000 ppm, while the second concentrated purge stream 124B may be about 1 kg/min with an impurity level of about 100,000 ppm. In the example, the condensed distillate streams 148A, 148B may be about equal to 50 kg/min, with some small amount diverted for the second concentrated purge stream 124B, and possibly some diverted to the volatile fractions and/or non-condensable streams (not shown).

The system 001 further includes a controller 114 having modules to functionally execute the steps of purifying the waste fluid stream 104. The controller 114 may be a part of the separation system 100, although the controller 114 is shown separately in the embodiment of FIG. 1A. The controller 114 includes an operating conditions module, a user request module, a process control module, and an actuation module. The operating conditions module interprets operating conditions, such as temperatures, pressures, flow rates, and the like, by reading various sensor values, receiving data messages over a network 010, and/or through any other method understood in the art. The user request module interprets at least one user request comprising a target parameter value, for example a stream flow rate target. The user request module may interpret a user request by receiving a data message over the network 010, by comparing an operating condition to a pre-calibrated value, or the like. Without limitation, a user for the request module may be a person (not shown), but may also be an application 006, a computer 012 in communication with the application 006, and/or a computer 014 in use by a person (not shown) monitoring the system 001.

The process control module generates at least one system response based on the operating condition(s) and user request (s). For example, the user request may indicate a target flow rate for a stream, and the process control module generates a system response by calculating a valve position required to achieve the target flow rate for the stream. The system response is communicated to the actuation module. The actuation module controls at least one actuator based on the system response. For example, the system response may indicate that a valve position should be 30%, and the operating conditions indicate the valve is at 60%. The actuation module controls the valve from 60% to 30%, in one embodiment with a proportional-integral-derivative (PID) controller to move the valve smoothly to the valve position target indicated by the actuator signal.

The system 001 may further include a network 010. In the embodiment of FIG. 1A, the network 010 connects the computers 012, 014 to each other and to the controller 114. Additionally, the network 010 may connect modules within the controller 114 to each other, and may connect the controller 114 to the separation system 100. The network may comprise multiple components, for example a LAN, WAN, satellite connection, the internet, and communications within a server and/or computer.

In one example, a wellsite foreman (not shown) may enter a purified water level target into a computer 012, which is communicated to the user request module over the network 010. A sensor communicates a purified water level in the purified water storage 004 to the controller 114, which the operating conditions module interprets and provides to the process control module. The process control module generates a system response and provides it to the actuation module, which controls an actuator based on the system response. In the example, the purified water level in the purified water storage 004 may be too low, and the process control module may determine that the system response is to increase the operating pressure of the separation system 100 to increase the purification capacity. The actuation module may perform the physical manipulations of pumps, heat exchangers, and valves to achieve the generated system response, i.e. to increase the separation system 100 operating pressure. Any of the modules of the controller 114 may be located remotely. For example, the process control module may operate on a computer 014 on the desk of a sales engineer remote from the location of the separation system 100.

Figure 1B:
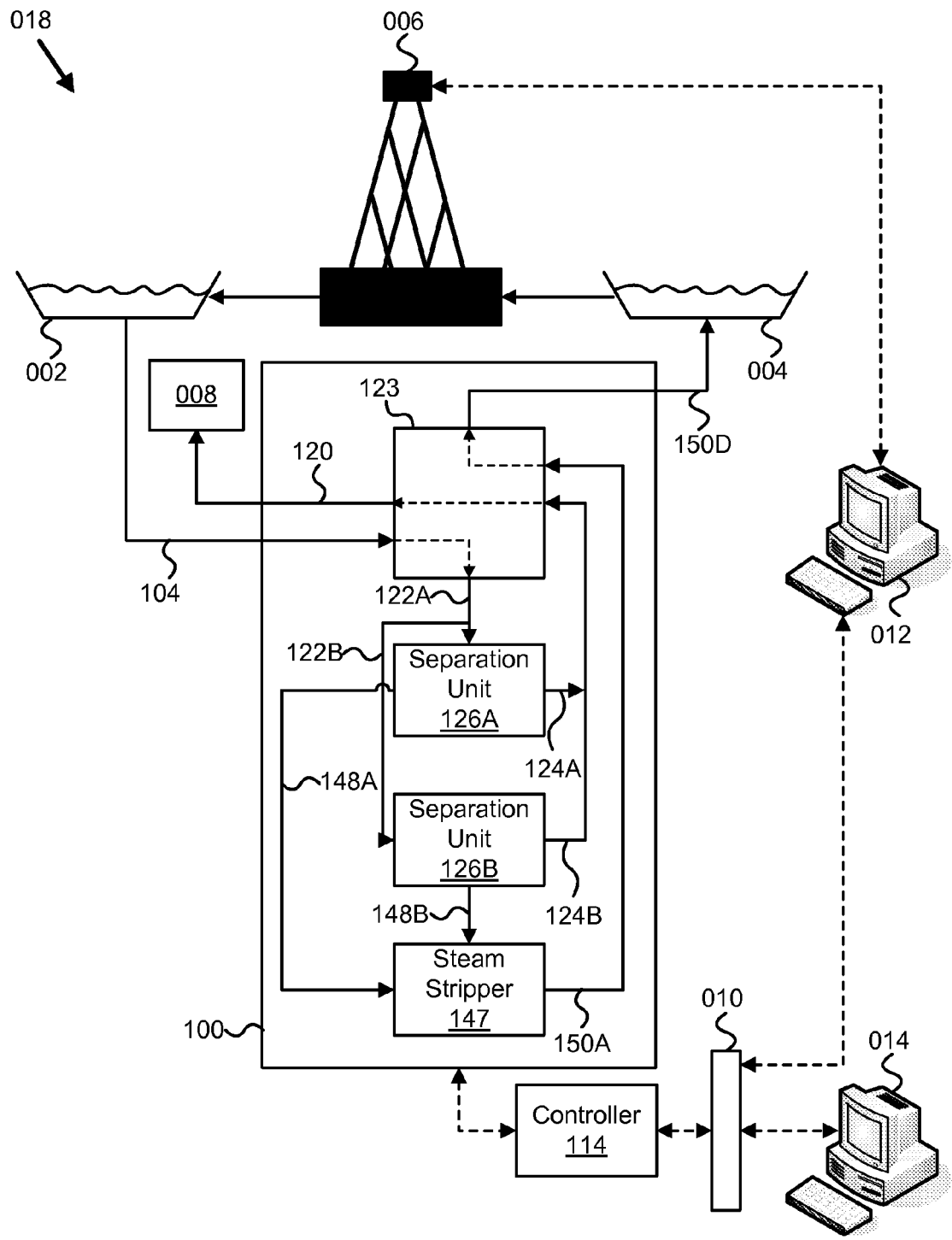
FIG. 1B is a schematic block diagram illustrating an alternate embodiment of a system to provide waste water purification services in accordance with the present invention.

FIG. 1B is a schematic block diagram illustrating an alternate embodiment of a system 018 to provide waste water purification services in accordance with the present invention. The primary difference between the system 018 to provide waste water purification services shown in FIG. 1B and the system 001 to provide waste water purification services shown in FIG. 1A is that the separation units 126A, 126B in the system 018 are arranged in a parallel configuration. In this parallel configuration, the waste fluid stream 104 is sent directly to each separation unit 126A, 126B and the concentrated purge streams 124A, 124B are sent directly to the secondary recovery heat exchanger 123. The series configuration shown in FIG. 1A exhibits more efficient separation, i.e. better purification for a given energy utilization, while the parallel configuration shown in FIG. 1B exhibits a greater flexibility of operations and throughput.

The embodiment of FIG. 1B can be implemented within the same system 001 as the embodiment of FIG. 1A, as valves and piping can be installed such that the systems 001, 018 can be reconfigured between parallel and series operation with the movement of a few actuators. The reconfiguration of the system 001 to system 018 can be useful to temporarily increase the treatment capacity of the waste fluid stream 104 during peak operation periods, while retaining the ability to return to more efficient series operation during times of lower system capacity demand. Further, one separation unit 126A, 126B can be shut down for cleaning, maintenance, or repairs while the other separation unit 126B, 126A continues operation. In one embodiment, a user can request series and/or parallel operation, and the controller 114 implements the appropriate operational configuration. The controller 114 may be further configured to automatically switch between series and parallel operation to meet specified design requirements and/or to operate in a mode that better meets design constraints such as energy usage, purification capacity, impurity concentrations in the concentrated purge streams 124A, 124B, impurity concentrations in the purified product stream 150D, and the like.

Figure 2:
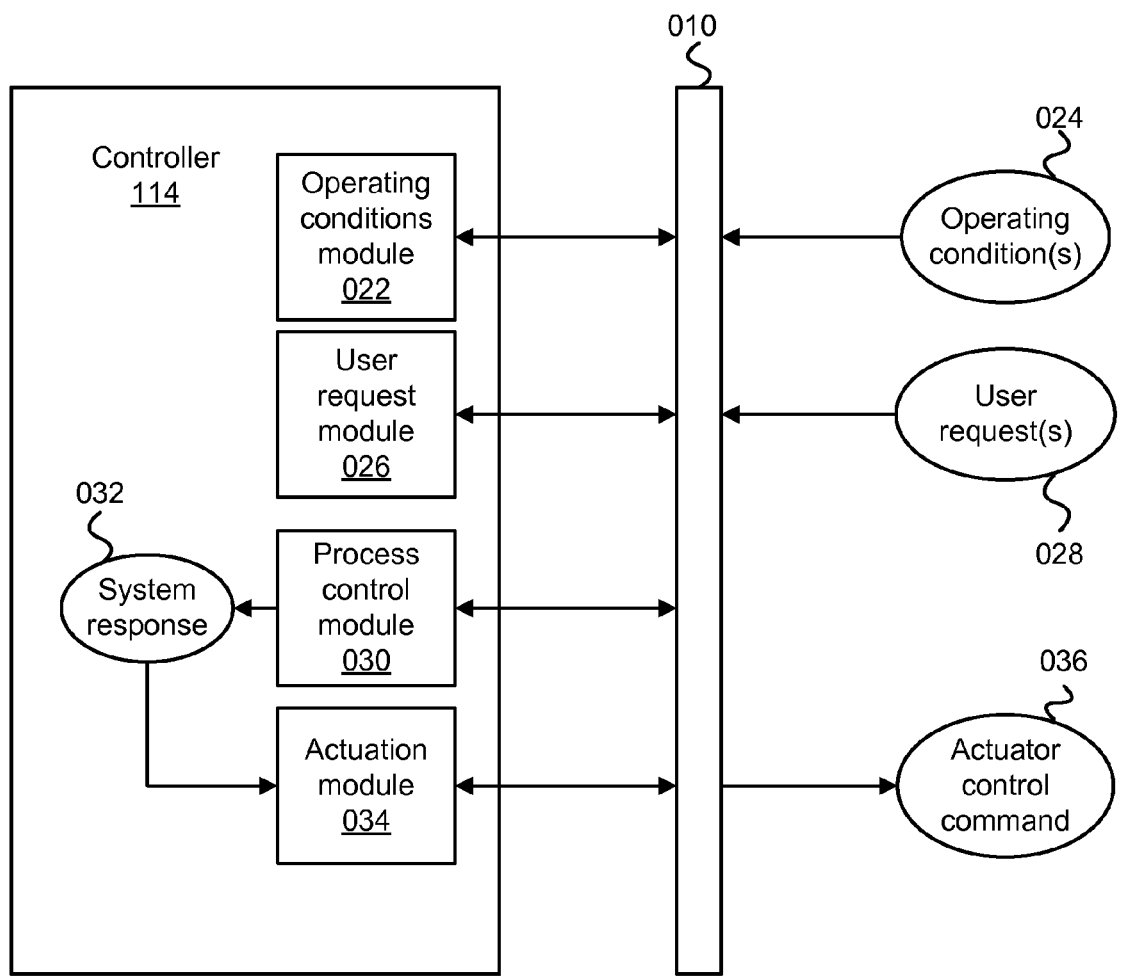
FIG. 2 is a schematic block diagram illustrating one embodiment of a controller in accordance with the present invention.

FIG. 2 is a schematic block diagram illustrating one embodiment of a controller 114 in accordance with the present invention. The controller 114 includes an operating conditions module 022 that interprets at least one operating condition 024. An operating condition 024 may be a parameter in the system that can be measured and/or estimated. The operating condition 024 may be a waste fluid stream impurity concentration, a waste fluid stream flow rate, a steam inlet temperature, a recirculation stream flow rate corresponding to one or more separation units 126A, 126B, a recirculation stream temperature corresponding to one or more separation units 126A, 126B, a purified product stream flow rate, a purified product stream impurity concentration, and/or a purge stream concentration corresponding to one or more separation units 126A, 126B. Interpreting an operating condition 024 may include reading parameters from a datalink, interpreting sensor input values, calculating operating conditions 024 based on other detected parameters, and the like. The operating conditions module 022 may provide operating condition 024 information to other modules within the controller 114 through communication within the controller 114 and/or through communication over the network 010.

The controller 114 includes a user request module 026 that interprets at least one user request 028. A user request 028 is a target value for a parameter in the system 001, and a user may be a person, computer, and/or system in communication with the controller 114. For example, the user request 028 may be a purified product stream flow rate request, a purified product stream impurity concentration request, an inlet steam flow rate request, a purge stream concentration request corresponding to one or more of the separation units 126A, 126B, a waste fluid stream flow rate request, a steam stripper reflux ratio request, a purge stream temperature request corresponding to one or more of the separation units 126A, 126B, a purified water storage level request, a waste water storage level request, an evaporation unit fluid level request, or a stripping vessel fluid level request. The user request module 026 may receive a user request 028 for one or more separation units 126A, 126B, and may receive multiple user requests 028. For example, the operating conditions module 022 may comprise "smart sensors" having dedicated computers configured to provide directly readable output, and thereby the interpretation from physical values (e.g. voltages) to computer-usable data may be generated at the various sensors and published to a network 010 for use by other parts of the controller 114.

The controller 114 includes a process control module 030 that generates at least one system response 032. The process control module 030 bases the system response 032 on the operating condition(s) 024 in response to the user request(s) 028. For example, the user request 028 may be a target temperature of a recycle stream and the system response 032 may be a signal that manipulates a steam inlet valve to achieve the target temperature of the recycle stream. In one embodiment, the process control module 030 may generate multiple system responses 032, each system response 032 generated in response to one or more user requests 028, and each system response 032 based on appropriate operating conditions 024 relating to the user request 028. The system response 032 may be a target valve position, fluid stream flow rate, pump output, fluid level, target temperature, or the like. The system response 032 may be communicated as a current or voltage, a data link communication element, an electrical signal, a computer data element, or the like. For example, the system response 032 may be the value of a variable in a computer program on a computer readable medium, where the value of the variable indicates a valve percent open value.

The controller 114 includes an actuation module 034 that controls at least one actuator based on the system response 032. The actuation module 034 may issue an actuator control command 036 based on the system response 032. For example, the system response 032 may be a value of a variable in a computer program on a computer readable medium, where the value of the variable indicates a valve percent open value, and the actuator control command 036 may be a pulse-width modulated (PWM) signal based on the value of the variable indicating the desired motor speed. In the example, the value of the variable indicating the desired motor speed (system response 032) may be 50%, and the actuator control command 036 may be a PWM signal with a 50% duty-cycle.

The controller 114, portions of the controller 114, and/or any computers 012, 014 associated with the system 001, 018 may be distributed in any physical locations. In one example, the operating conditions module 022 is a computer program on a computer attached to the separation system 100 at a wellsite in Texas having an application 006. In the example, a user (not shown) enters a user request 028 on a computer 012 at the application 006 for a concentrated purge stream 120 to have a KCl concentration of 100,000 ppm. The user request module 026 interprets the user request 028, the operating conditions module 022 interprets appropriate operating conditions 024, and the process control module 030 calculates the system response(s) 032 to achieve the user request 028 based on the current operating conditions 024. The actuation module 034 controls actuators based on the system response(s) 032 by generating actuator control command(s) 036. In a further example, an engineer monitoring the separation system 100 in Tulsa on a computer 014 notes that the application 006 has a hydraulic fracture treatment scheduled in two days and inputs a user request 028 for a higher level in the purified water storage 004. In one embodiment, the process control module 022 calculates the system response(s) 032 required to meet all of the user request(s) 028, prioritizes between user request(s) 028, and/or notifies the controller 114 that a user request 028 cannot be met.

Figure 3:
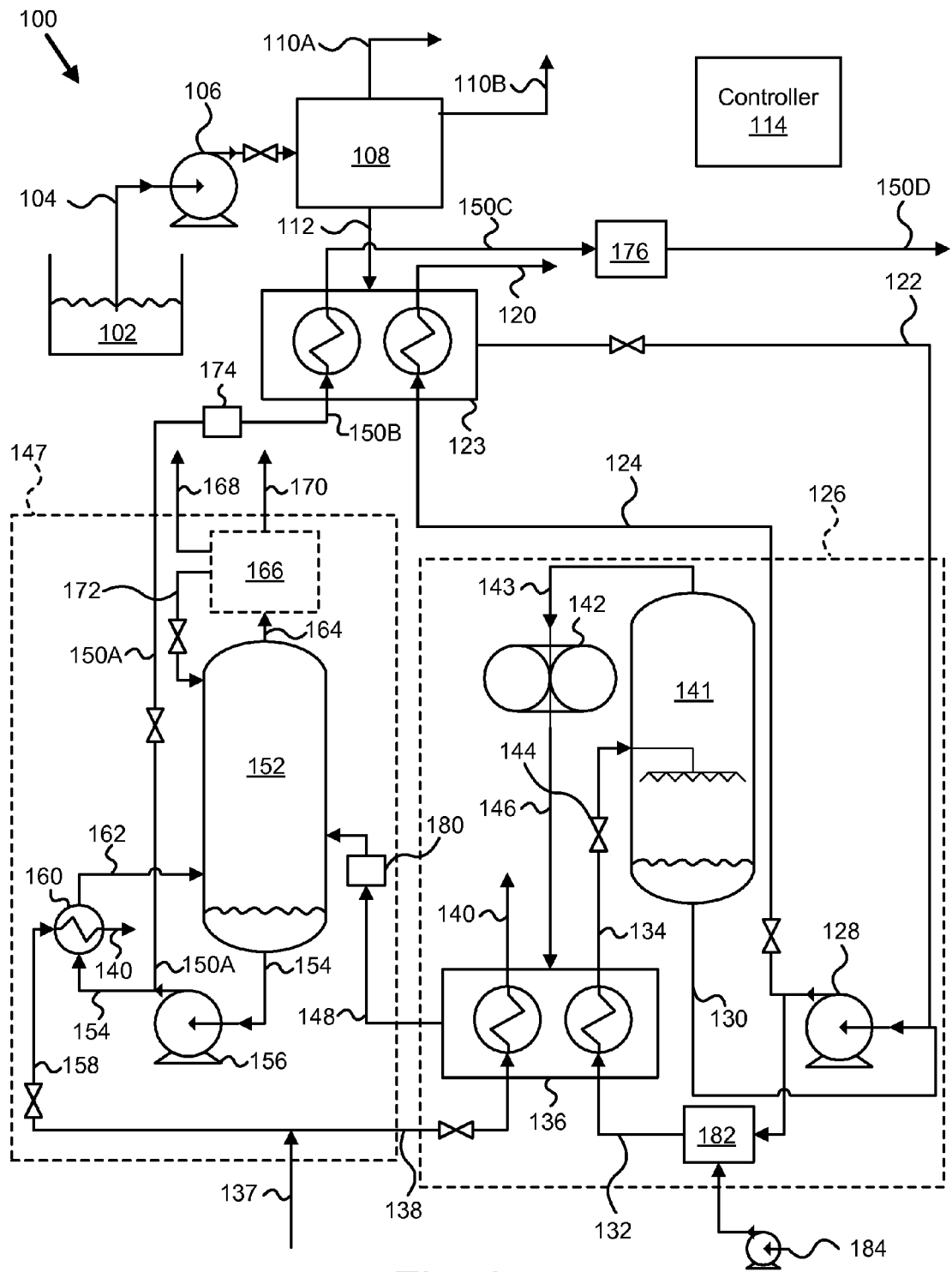
FIG. 3 is a schematic block diagram illustrating one embodiment of a system for purifying a waste stream in accordance with the present invention.

FIG. 3 is a schematic block diagram illustrating one embodiment of a system 100 for purifying a waste stream in accordance with the present invention. The system 100 includes a feed tank 102 holding the waste fluid to be treated. In one embodiment, the waste fluid is waste water from an oilfield process, although any other supply of waste fluid may be used. The waste fluid enters as a waste fluid stream 104 and is supplied by a feed pump 106 to a water-oil separator 108. The waste fluid stream 104 may enter the feed pump 106 directly from any oilfield process, industrial process, landfill leachate, and/or naturally occurring water source instead of from a feed tank 102.

The separator 108 may be a coalescing separator, a settling tank, or any other mechanism known in the art that separates bulk oil from water. The separator 108 may further perform liquid-solid separation, for example separating large solids such as proppant used to stimulate a well, or sands from a loosely consolidated formation. The separator 108 may include a wedge-wire self-cleaning pre-screen, a rotary screen filter, or similar mechanisms to perform the liquid-solid separation. The separated solids 110A may leave the separator 108 as a solids waste stream 110A. Bulk oil leaves the separator 108 as a liquid stream 110B. Bulk oil may be any hydrocarbon or other liquid immiscible in water and with a density lower than the density of water. Bulk water leaves the separator 108 as a feed stream 112. After the separator 108, the feed stream 112 comprises water with impurities. The impurities may include dissolved minerals, salts, methanol, other alcohols, hydrocarbon products and/or formation fluids from a well, various chemicals and fluids used to treat the well, and/or any other soluble or miscible fluids that are to be removed from the feed stream 112.

The system 100 includes a controller 114 that controls various temperatures, pressures, flow rates, fluid levels, and/or other system operating attributes that will become clear in various embodiments described herein. The controller 114 may be in communication with various sensors and actuators (not shown) depending upon the controls in a specific embodiment. The sensors may measure parameters including pressures, temperatures, fluid levels, flow rates, densities, and/or other parameters of any stream or vessel. The actuators may include electronic, hydraulic, and/or pneumatic manipulation of any valves, pumps, blowers, and/or other physical components of the system 100. The controller 114 may be electronic (e.g. a computer with an electronic interface), mechanical (e.g. springs or the like to respond to various system parameters in prescribed ways), and/or may include a manual aspect (e.g. a sight gauge and a hand valve wherein an operator controls a tank level).

The feed stream 112 is directed to a secondary recovery heat exchanger 123, which may be a shell-and-tube heat exchanger or other type of heat exchanger known in the art. The secondary recovery heat exchanger 123 transfers heat from one or more exiting streams that may have residual heat from the separation process of the system 100 to the feed stream 112 to create a pre-heated feed stream 122. The pre-heated feed stream 122 enters a separation unit 126 that removes impurities from the pre-heated feed stream 122. In one embodiment, the separation unit 126 is a mechanical vapor recompression unit. In the separation unit 126, the pre-heated feed stream 122 may be mixed with a concentrated bottoms stream 130, and fed through a recirculation pump 128. The recirculation pump 128 outlet may be split into a pre-recovery concentrated purge stream 124 and a recirculation stream 132. The pre-recovery concentrated purge stream 124 passes through the secondary recovery heat exchanger 123 and transfers residual heat to the feed stream 112 before exiting as a concentrated purge stream 120.

In one embodiment, the secondary recovery heat exchanger 123 heats the feed stream 112 after the separator 108 removes the solids waste stream 110A from the waste fluid stream 104, but before the separator 108 removes the liquid stream 110B from the waste fluid stream 104. The heating of the waste fluid stream 104 after solids waste stream 110A removal allows the secondary recovery heat exchanger 123 to avoid unnecessarily heating the solids waste stream 110A, while providing some heat to assist in quickly separating the liquid stream 110B. In one embodiment, the separator 108 includes multiple stages and components to perform solid waste removal in one or more stages, and to perform liquid removal in one or more stages. The secondary recovery heat exchanger 123 is shown downstream of the separator 108, but may be upstream of the separator 108 and/or distributed between stages of the separator 108.

The separation unit 126 includes an evaporation unit 141 that provides the concentrated bottoms stream 130 to the recirculation pump 128. The evaporation unit 141 accepts a heated recirculation stream 134 that may be heated in a primary heat exchanger 136 by a steam inlet stream 138 tapped from a system steam inlet 137. For the purposes of a clear description, the heat inlet stream 137 is referred to as a system steam inlet 137, but the heat inlet stream 137 and related streams (e.g. 138, 140, 158) may comprise any heat inlet medium including heated glycol, heated oil, and/or other heat transfer media configured to deliver thermal energy from a heat source (not shown) to the heat exchangers 136, 158. The steam inlet stream 138 may leave the primary heat exchanger 136 as a cooled steam outlet 140. The recirculation stream 132 may further accept heat from a distillate stream 143 out of the evaporation unit 141, wherein the distillate stream 143 is taken from the evaporation unit 141 by a blower 142 and passed through the primary heat exchanger 136.

The primary heat exchanger 136 may be a shell-and-tube heat exchanger with the recirculation stream 132 passing on the tube-side. Preferably, the recirculation stream 132 passes through the heat exchanger 136 in highly turbulent flow, increasing the heat transfer rate and reducing the amount of fouling in the heat exchanger 136. Alternatively, the heat exchanger 136 may be a plate and frame heat exchanger 136, or other heat exchanging device known in the art.

In one embodiment, the heat exchanger 136 is configured to transfer the heat of vaporization from a charged distillate stream 146 to the recirculation stream 132, and also heat from a steam inlet stream 138 to the recirculation stream 132. The heat transfer may be staged such as first transferring the heat of vaporization from the charged distillate stream 146, then transferring the heat from the steam inlet stream 138. In one embodiment, the charged distillate stream 146 exits the primary heat exchanger 136 as a condensed distillate stream 148 at a temperature just below the boiling point of the condensed distillate stream 148. The primary heat exchanger 136 may be designed to deliver the condensed distillate stream 148 at a specified temperature and/or at a specified pressure, and one of skill in the art recognizes the selection of the specified temperature and/or specified pressure affects the final pressure and/or temperature of the condensed distillate stream 148.

In the prior art, mechanical vapor recompression recirculation streams 132 flow at a ratio from below about 25 to about 200. The recirculation ratio is defined as the mass flow of recirculation stream 132 divided by the mass flow of the distillate stream 143. In the present invention, recirculation ratios in the range from below 25 to about 200 are useful when combined with other features of the present invention. Waste fluid streams 104 with low thermal conductivity, specific heat and/or a high tendency to foul in the heat exchanger 136 indicate higher recycle ratios. The economics of pumping losses and potential sub-cooling of the charged distillate 146 in the heat exchanger 136 indicate lower recycle ratios. The use of the steam-stripping system 147 and other novel aspects of the present invention allow recycle ratios of 200-300 or greater where the upper economic limit was about 200 times in the prior art, although other aspects of the present invention also differ from the prior art. The heated recirculation stream 134 may pass into the evaporation unit, possibly through an orifice 144 near the evaporation unit 141 entrance such that the heated recirculation stream 134 flashes into the evaporation unit 141. The orifice 144 is designed to enhance the flash effect of the heated recirculation stream 134. The orifice 144 may be further configured to maintain backpressure on the heat exchanger 136 such that vapor bubbles do not form in the heat exchanger 136, helping to prevent cavitation, wear, and fouling of the heat exchanger. In one embodiment, the orifice 144 may be a valve controlled by the controller 114, and/or set manually, to provide a designed and/or controlled back pressure on the heated recirculation stream 134.

The heat transfer of the primary heat exchanger 136 is further enhanced by high flow rates of the recirculation stream 132. Using plate-frame heat exchanger elements, and using a shell and tube heat exchanger, recirculation rates above 200× (i.e. mass flow of recirculation stream 132 is 200 times the mass flow of the distillate stream 143) economically improve the heat transfer in the primary heat exchanger 136. In other words, the additional pumping losses incurred by increasing the flow rate are lower than the additional capital costs required to purchase a larger primary heat exchanger. Increasing recirculation rates generally improves the system 100 up to about 300×, although in primary heat exchangers 136 that must be constructed with exotic materials (e.g. titanium alloys, porcelain enamels, etc.), for example due to highly corrosive impurities, the recirculation rates may be economically set even higher to save capital costs. Also, recirculation rates may be economically higher when the size of the system 100 is at a premium—for example a system 100 installed on an offshore drilling platform or a system 100 designed to fit on a standard commercial vehicle.

The evaporation unit 141 accepts the flashed heated recirculation stream 134, and has a liquid bottoms to supply the concentrated bottoms stream 130, and a distillate stream 143. The distillate stream 143 will be largely water, and will further include any components of the feed stream 112 that have a volatility near or greater than water. A blower 142 may draw the vapors off of the evaporation unit 141, and send the charged distillate stream 146 through the primary heat exchanger 136. The charged distillate stream 146 leaves the primary heat exchanger 136 as a condensed distillate stream 148.

The system 100 includes a steam-stripping system 147 that strips volatile and non-condensable impurities from the condensed distillate stream 148, and creates a stripped product stream 150A that is ready for final processing. The steam-stripping system 147 includes a stripping vessel 152 that accepts the condensed distillate stream 148, and has a stripper bottoms stream 154. A stripper recycle pump 156 recycles the bottoms stream 154 through a reboiler 160, which may be a heat exchanger using a stripper steam inlet 158 taken from the system steam inlet 137 and/or other heated medium as described above to heat the bottoms stream 154.

The reboiler 160 heats the bottoms stream 154 to a temperature above the boiling point for target impurities in the condensed distillate stream 148, but at or below the boiling point for water. In one embodiment, the reboiler 160 heats the condensed distillate stream 148 to a temperature just below the boiling point for water. The selection of the temperature for the heated bottoms 162 is an economic decision based on the required water purity of the purified product stream 150D, the cost of steam or available heat source, the target impurities, and similar parameters that vary for specific embodiments of the steam-stripping system 147. It is within the skill of one in the art to determine an economic heated bottoms 162 temperature based on the disclosures herein. The heated bottoms stream 162 is reinjected into the stripping vessel 152, driving volatiles and organic fractions out the top in a stripper vapor outlet 164. The spent steam exits the system 100 as a cooled steam outlet 140.

The steam inlet stream 138 may be a small temperature offset (e.g. +/−10° F. offset) above the temperature of the heated recirculation stream 134, while the steam return stream 140 may be at about the temperature of the heated recirculation stream 134. For example, the steam inlet stream 138 may be 250° F. while the recirculation stream 132 may be 235° F. The temperature offset allows the primary heat exchanger to remain in an efficient heat transfer regime.

The stripper vapor outlet 164 passes to a condensing system 166, which divides the stripper vapor outlet 164 into a volatile fraction stream 168, a non-condensable stream 170, and a stripper reflux stream 172. A reflux ratio is defined as the mass flow rate of the stripper reflux stream 172 divided by the sum of the mass flow rates of the volatile fraction stream 168 and the non-condensable stream 170. The reflux ratio may vary with the amount of separation required (e.g. the organic fraction of impurities), the size of the stripping vessel 152, the temperatures of the various streams 148, 154, 162, 164, and the boiling points of the various components in the condensed distillate stream 148. Typically, a reflux ratio between about 0.5 and 20.0 will suffice to achieve an acceptably purified stripped product stream 150A. In other embodiments, various cost considerations may drive a higher or lower reflux ratio. For example where recovery of a valuable volatile fraction from the condensed distillate stream 148 is a primary goal, a reflux ratio higher than 20.0 may be economically desirable. In another example, where a volatile fraction has a much higher vapor pressure than water, a lower reflux ratio may suffice. In a further example, a reflux ratio of up to 150 may be used to remove methanol.

The stripped product stream 150A may enter an oxidizer unit 174 to remove final traces of alcohols, soluble oils, phenols, and/or any other contaminants. The oxidizer unit 174 may oxidize the stripped product stream 150A via chemical (e.g. peroxide, bleach, ozone, etc.) and/or ultraviolet means, and the oxidizer unit 174 may include a sonic and/or ultrasonic vibration unit to enhance the oxidization. The oxidized product stream 150B may be passed through the secondary recovery heat exchanger 123 to return remaining heat from the steam-stripping system 147 to the feed stream 112. In one embodiment, the oxidized product stream 150B may utilize a separate heat exchanger (not shown) from the heat exchanger 123 utilized by the pre-recovery concentrated purge stream 124. The post-secondary heat recovery stream 150C may be passed through a final processing unit 176, for example a carbon adsorber, before discharge as a purified product stream 150D. The stripped product stream 150A may pass through an oxidizer unit 174, the secondary recovery heat exchanger 123, and/or the final processing unit 176 in any order, and some or all of these components may be present in a given embodiment of the present invention.

The flows, temperatures, pressures, and other parameters of the various streams in the system 100 vary according to the application and may be controlled by the controller 114. In one example, the waste fluid stream 104 flows between 0.3 and 90 gallons per minute (gpm), and is limited primarily by the capacity of the evaporation unit(s) 141. The purified product stream 150D flow rate depends upon the required final purity of the stream and the concentration of impurities in the waste fluid stream 104, but will typically be a flow rate about 90% of the waste fluid stream 104. The concentrated purge stream 120 will be the remainder of the waste fluid stream 104, less the volatile fraction stream 168 and the non-condensable stream 170. The controller 114 may control the concentrated purge stream 120 to a temperature selected for safe handling (e.g. 140° F.), and/or for other concerns downstream such as the cooling capacity of a waste handling system (not shown).

The pre-recovery concentrated purge stream 124 may be controlled to 230-240° F., and this temperature may be selected according to the specifications of the primary heat exchanger 136 and/or the secondary recovery heat exchanger 123. The recirculation pump 128 may operate at about 2-15 psig on the suction side (pre-heated feed stream 122) and 25-55 psig on the discharge side (recirculation stream 132).

The controller 114 may control the amount of the pre-recovery concentrated purge stream 124 to keep the desired concentration in the concentrated purge stream 120. For example, the waste fluid stream 104 may include 1,000 ppm impurities, and the controller 114 may control the pre-recovery concentrated purge stream 124 to 50,000 ppm impurities. In the example, ignoring the volatile fraction stream 168 and the non-condensable stream 170, at steady state with a waste fluid stream 104 of 100 gpm, the concentrated purge stream 120 would be about 2 gpm, while the purified product stream 150D would be about 98 gpm. The controller 114 may utilize varying concentrations, temperatures, and/or flow targets during transient operations such as system 100 startup, concentration variations in the waste fluid stream 104, and the like.

In one embodiment, the concentration of the concentrated bottoms stream 130, which controls the concentration of the concentrated purge stream 120, may be limited by the solubility of the impurities in water. For example, the upper limit of certain salt concentrations may be 200,000 to 400,000 ppm or greater according to the solubility limit of the particular impurity. The type of impurity and the concentration of the pre-recovery concentrated purge stream 124 depend upon the application of the system 100. The final concentration of the pre-recovery concentrated purge stream 124 may be limited by the pumpability of the pre-recovery concentrated purge stream 124, and therefore any concentration up to saturation may be utilized. Concentrations beyond saturation may be utilized in certain applications where solids are present but in a pumpable suspension Some solids can be precipitated in the concentrated waste and do not typically affect the operation of the evaporator.

In one embodiment, the concentration of the concentrated bottoms stream 130 may be selected according to the utilization of the concentrated purge stream 120 as an intended product. For example, the concentrated purge stream 120 may be utilized as a 4% KCl solution, and the controller 114 may control the concentration of the concentrated bottoms stream 130 such that the concentrated purge stream 120 exits the system 100 as a 4% KCl solution.

The blower 142 moves the vapor from the evaporation unit 141 through the primary heat exchanger 136. In one example, the blower 142 operates at about 5-14 psig on the suction side (i.e. the distillate stream 143) and about 7-25 psig on the discharge side (i.e. the charged distillate stream 146). The charged distillate stream 143 may be de-superheated (i.e. cooled to the dew point but still steam) by a heat exchanger (not shown) just after the blower 142, or by direct injection of condensed recovered water (not shown) into the blower 142 suction. The de-superheating may be performed by cooling water (not shown), by heat exchange with the feed stream 112 and/or another stream in the system 100. The charged distillate stream 146 enters the primary heat exchanger 136 at approximately the temperature of the dew point of the charged distillate stream 146. The condensed distillate stream 148 exits the primary heat exchanger 136 at a temperature offset above the recirculation stream 132 temperature—for example about 2-3° F. above the recirculation stream 132 temperature and/or just at or below the boiling point of the condensed distillate stream 148. In one embodiment, the blower 142 is a disc flow turbine (i.e. a "Tesla turbine") run as a pump, with work flowing from the shaft to the distillate stream 143.

In one embodiment, the system 100 includes a steam control unit 180. The steam control unit 180 provides backpressure to keep the condensed distillate stream 148 in a liquid phase and to provide condensed steam to the stripping vessel 152. The steam control unit 180 may comprise a steam trap or other steam control device. The steam control unit 180 may further comprise a pump that delivers the condensed distillate stream 148 to the stripping vessel 152.

In one embodiment, the controller 114 is configured to operate the system 100 at a higher pressure than atmospheric pressure. For example, the blower 142 may run at 5 psig on the suction side and 10 psig at the discharge side nominally, and the controller 114 may increase the pressure to 10 psig and 20 psig respectively under some conditions. Other pressures in the system 100 may likewise be increased, for example the pressures in the evaporation unit 141 and the stripping vessel 152. In one embodiment, the capacity of the system 100 in terms of the waste fluid stream 104 mass that can be accepted increases by about 5% for each one psi increase of the system 100 pressure. Therefore, the controller 114 can configure the system 100 capacity to a requirement of an application 006 and/or for other reasons. For example, applications 006 may include multiple purification systems 100, and one or more of the systems 100 may be shut down for maintenance. In the example, the controller 114 may increase the operating pressure for on-line systems 100 during the maintenance shutdown. Other uses of a configurable waste fluid stream 104 capacity are understood by one of skill in the art and contemplated within the scope of the present invention.

In one embodiment, the system 100 further includes an additives unit 182 that allows additives to be mixed into the recirculation stream 132. The location of the additives unit 182 in FIG. 3 is for example only, and the additives unit 182 may be placed anywhere in the recirculation from the concentrated bottoms stream 130 to the heated recirculation stream 134. The system 100 may further include an additives pump 184 that delivers additives to the additives unit 182. Additives may include anti-foaming agents, anti-corrosion agents, and/or another type of additive that may be beneficial for a given embodiment of the system 100.

Figure 4:
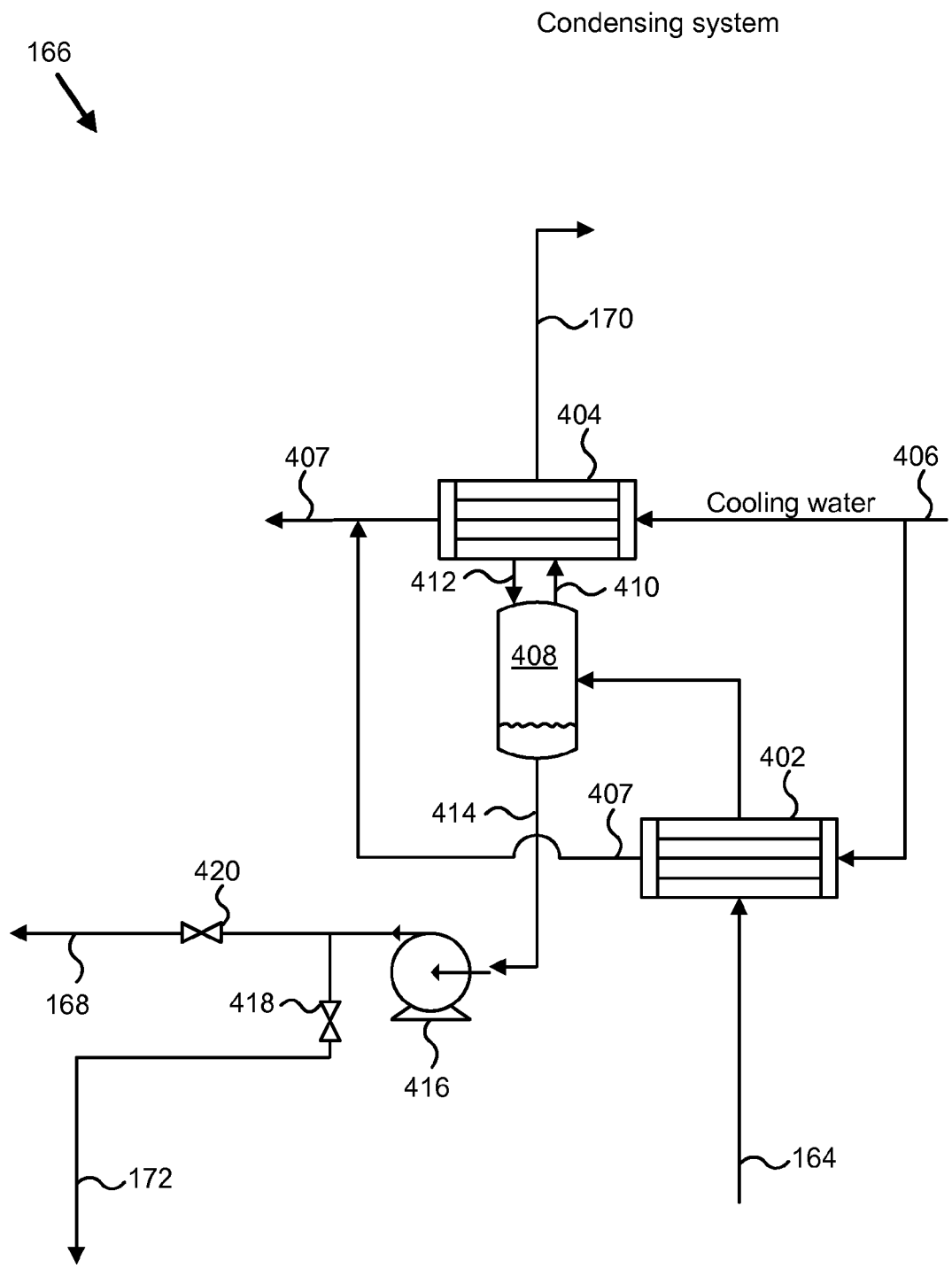
FIG. 4 is a schematic block diagram illustrating one embodiment of a condensing system in accordance with the present invention.

FIG. 4 is a schematic block diagram illustrating one embodiment of a condensing system 166 in accordance with the present invention. The condensing system 166 includes a pair of condensers 402, 404 accepting cooling water 406 from a water supply, and discharging spent water 407 out of the condensing system 166. A primary condenser 402 cools the stripper vapor outlet 164, sending the condensed fluid to a collection vessel 408. A collection vapor stream 410 goes to a secondary condenser 404 where the vapors leave as a non-condensable stream 170, and the liquid 412 is returned to the collection vessel 408. The liquid from the collection vessel 408 exits as a condensed stream 414, where a pump 416 may deliver it out of the condensing system 166.

One or more valves 418, 420 may control the liquid output from the condensing system 166, sending some liquid out as the volatile fraction stream 168, and returning a portion of the liquid to the stripping vessel 152 as the stripper reflux stream 172. Methanol and light oils that may not be separated from water in the separation unit 126 may typically be included in the volatile fraction stream 168. Other volatile compounds may be present in the volatile fraction stream 168 depending upon the impurities in the feed stream 112.

Figure 5A:
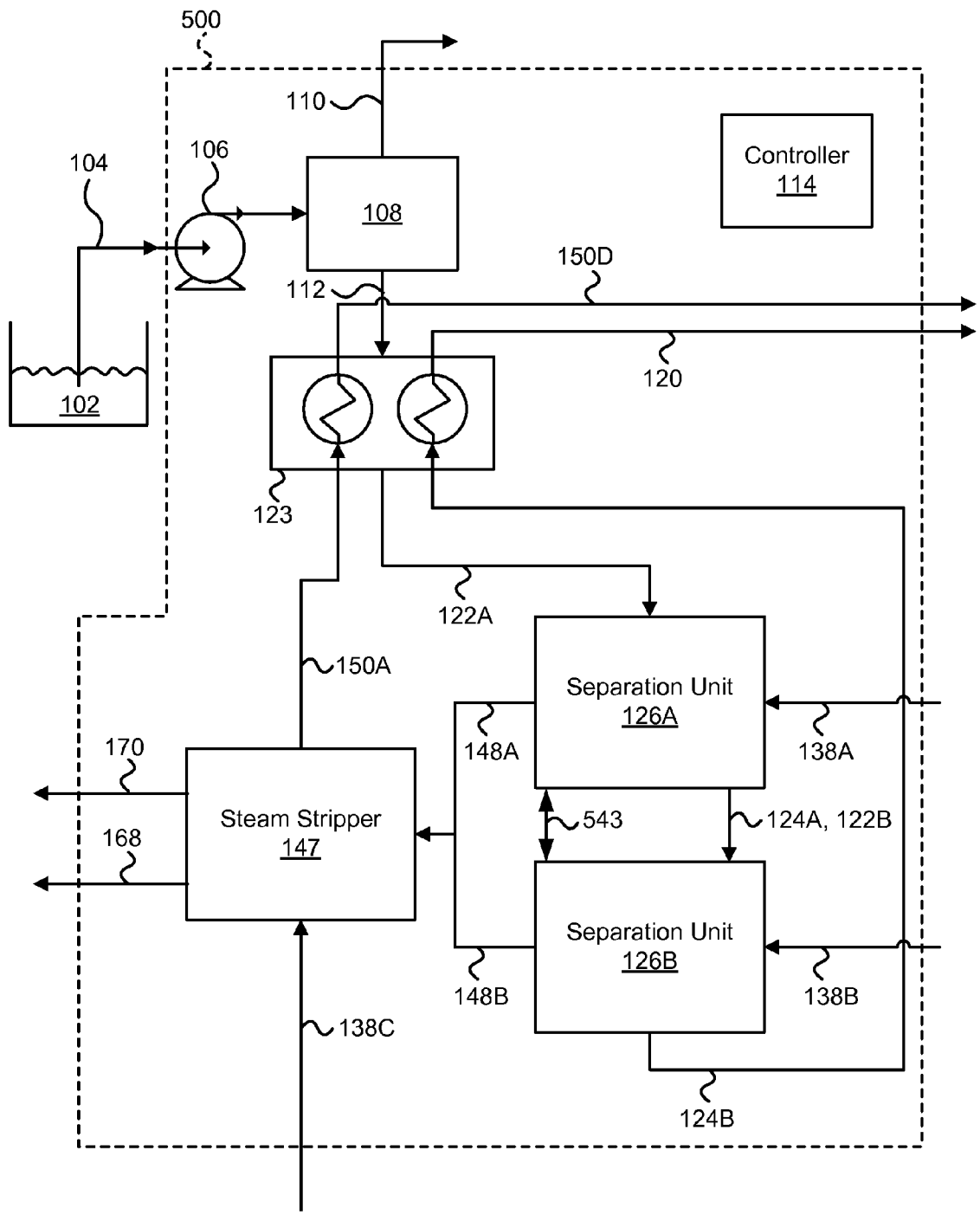
FIG. 5A is a schematic block diagram illustrating one embodiment of a system for waste water purification in accordance with the present invention.

FIG. 5A is a schematic block diagram illustrating one embodiment of a system 500 for waste water purification in accordance with the present invention. The system 500 is substantially similar to the system 001 depicted in FIG. 1A. FIG. 5A shows a first separation unit 126A and a second separation unit 126B in a series configuration. The embodiment of FIG. 5A illustrates one embodiment with more detail on the streams crossing the system 500 boundary; however, some of the elements of the system 001 that may be present in the system 500 are not shown to avoid obscuring aspects of the present invention.

The system 500 includes a vapor balancing stream 543 that connects a first distillate stream in the first separator 126A (see FIG. 3, element 143) to a second distillate stream in the second separator 126B (see FIG. 3, element 143). The vapor balancing stream 543 may be controlled by a valve (not shown) which may be a one-way valve or a two-way valve. The system 500 may be configured as a modular unit. The inlet streams and outlet streams of the system 500 may be configured to couple with quick disconnect fittings or other devices to make installation of the system 500 faster and more convenient. Additionally, the system 500 may be separable into one or more modules with quick disconnect fittings or other convenient interfaces. The system 500 and/or modules of the system 500 may be configured to fit on a commercial vehicle such that the system 500 can be easily transported on one or more commercial vehicles.

Figure 5B:
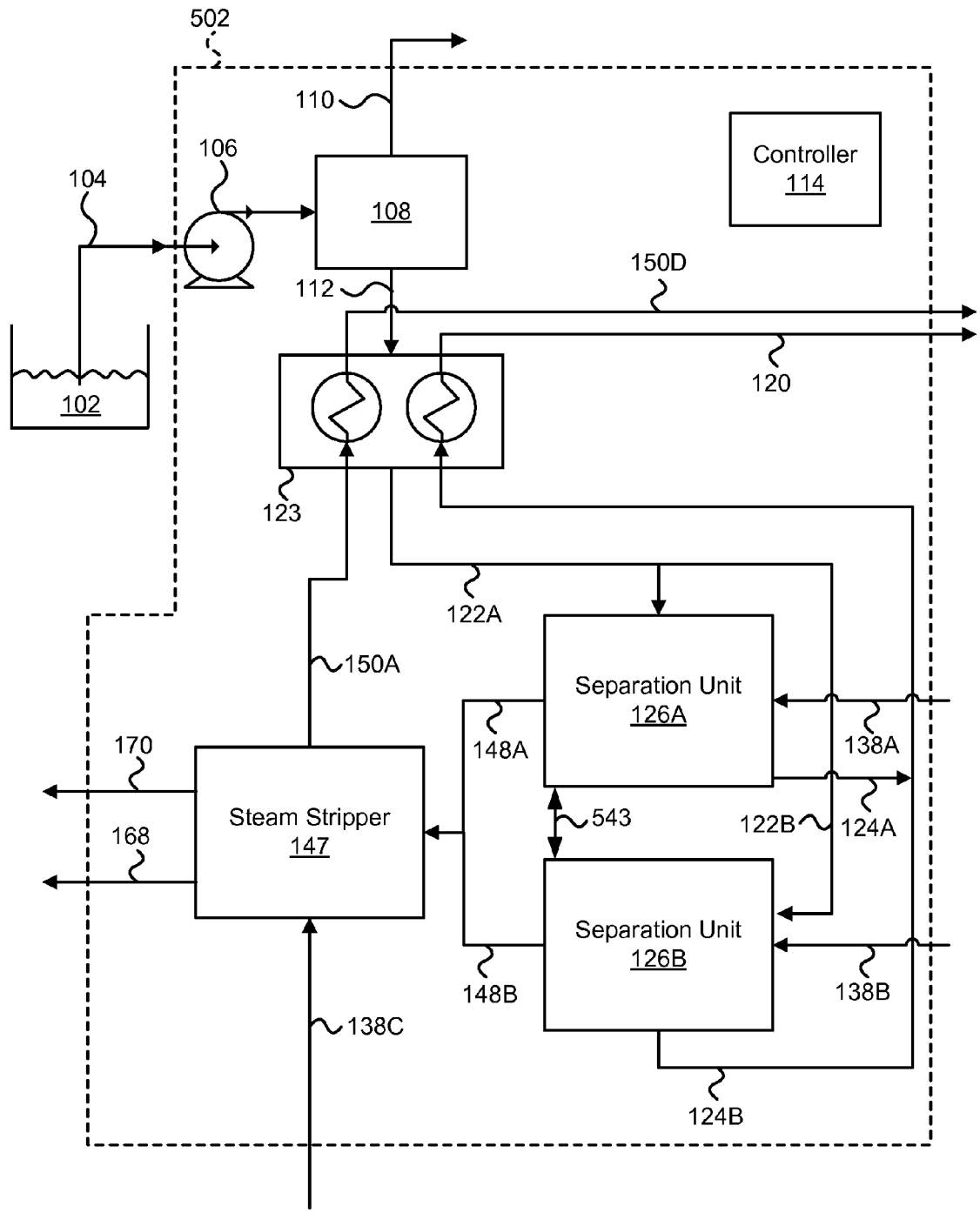
FIG. 5B is a schematic block diagram illustrating one embodiment of a system for waste water purification in accordance with the present invention.

FIG. 5B is a schematic block diagram illustrating one embodiment of a system 502 for waste water purification in accordance with the present invention. The system 502 is substantially similar to the system 018 depicted in FIG. 1B. FIG. 5B shows a first separation unit 126A and a second separation unit 126B in a parallel configuration. The embodiment of FIG. 5B illustrates one embodiment with more detail on the streams crossing the system 502 boundary; however, some of the elements of the system 018 that may be present in the system 502 are not shown to avoid obscuring aspects of the present invention.

The system 502 includes a vapor balancing stream 543 that connects a first distillate stream in the first separator 126A (see FIG. 3, element 143) to a second distillate stream in the second separator 126B (see FIG. 3, element 143). The vapor balancing stream 543 may be controlled by a valve (not shown) which may be a one-way valve or a two-way valve. The system 502 may be configured as a modular unit. The inlet streams and outlet streams of the system 502 may be configured to couple with quick disconnect fittings or other devices to make installation of the system 500 faster and more convenient. Additionally, the system 502 may be separable into one or more modules with quick disconnect fittings or other convenient interfaces. The system 502 and/or modules of the system 502 may be configured to fit on a commercial vehicle such that the system 502 can be easily transported on one or more commercial vehicles.

In one embodiment of the system 502, valves and connections are included such that the system 502 can be reconfigured to the system 500 through the manipulation of the valves. The valves and connections required to allow conversion of the system 502 into the system 500 are apparent to one of skill in the art. In a further embodiment, the system 502 may include multiple separation units 126, more than one secondary recovery heat exchanger 123, and/or more than one steam stripper 147. The system 502 may be configured to run groups of the separation units 126 in series and/or parallel based on current conditions such as the impurity levels in the waste fluid stream 104, the shutdown of one or more separation units for cleaning, repair, or maintenance, and the like. The transitions from one system 502 configuration to another may be controlled by the controller 114 based on detected operating conditions 024 and/or user requests 028.

Figure 6A:
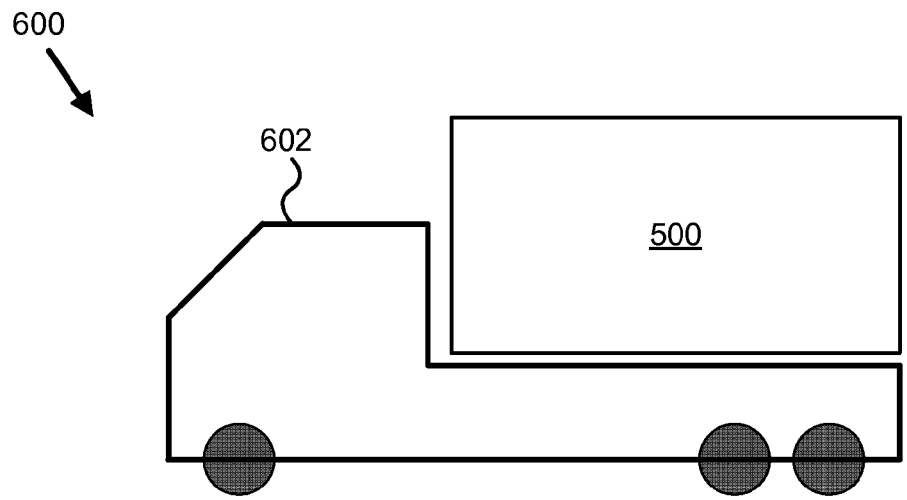
FIG. 6A is a schematic block diagram illustrating one embodiment of a system for waste water purification configured to fit on a single standard commercial vehicle in accordance with the present invention.
Figure 6B:
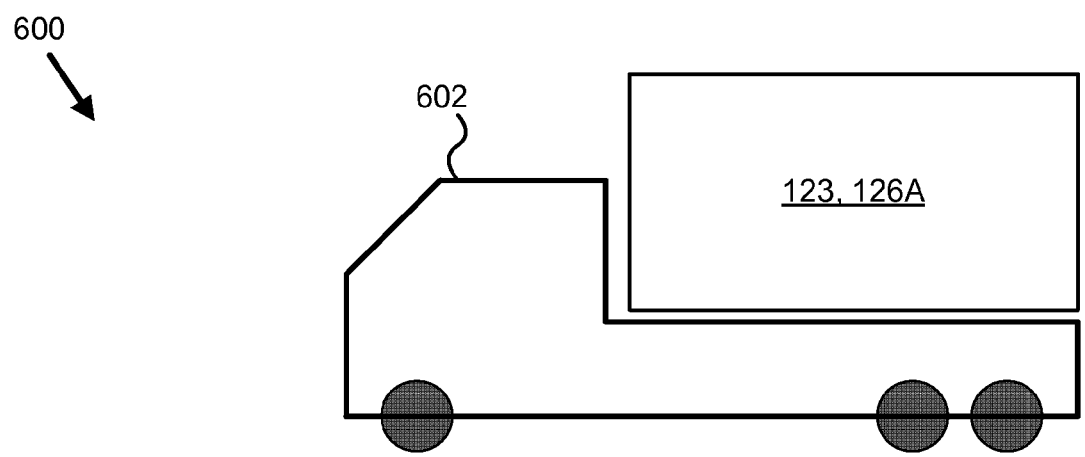
FIG. 6B is a schematic block diagram illustrating one embodiment of a system for waste water purification, wherein the steam stripper and each of the separation units comprise modules configured to assemble together, and wherein each of the modules is configured to fit on a singe standard commercial vehicle in accordance with the present invention.
Figure 6B:
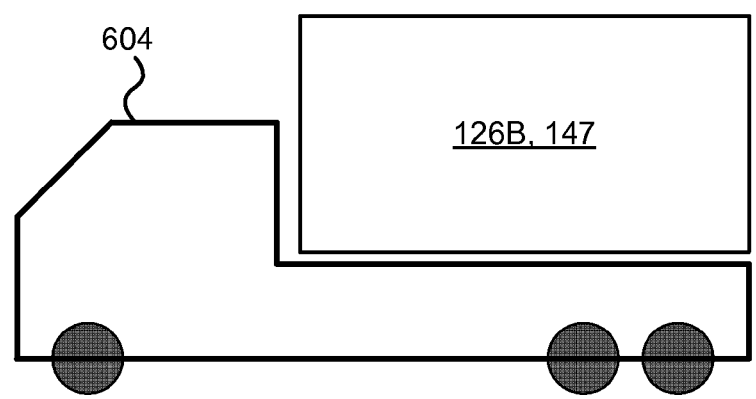

FIG. 6A is a schematic block diagram illustrating one embodiment of a system 600 for waste water purification configured to fit on a single standard commercial vehicle 602 in accordance with the present invention. Where the separation pod(s) 126, secondary recovery heat exchanger 123, and stream stripping system 147 are combined and small enough, the entire system 500 may fit on a single vehicle 602. Referring to FIG. 6B, the components of the system 500 may be modular and divided to fit on more than one commercial vehicle 602, 604. In the embodiment of FIG. 6B, the secondary recovery heat exchanger 123 and first separation pod 126A comprise a module on a first commercial vehicle 602, and the second separation pod 126B and the steam stripping system 147 comprise a module on a second commercial vehicle 604. As many modules and commercial vehicles may be utilized as required for a given application of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to provide waste water purification services, the system comprising:
   at least one separation unit, each separation unit comprising a mechanical vapor recompression separator, a primary heat exchanger, a steam stripper, and a secondary recovery heat exchanger;
   wherein the mechanical vapor recompression separator receives a recirculation stream comprising a combination of a waste water stream and a recycled liquid bottoms stream, the recycled liquid bottoms stream being supplied from the mechanical vapor recompression separator;
   wherein the primary heat exchanger receives an evaporation stream from the mechanical vapor recompression separator and the recirculation stream, the primary heat exchanger facilitating heat transfer between the evaporation stream and the recirculation stream;
   wherein the system for wastewater purification receives water from a waste water storage, purifies the water, and returns the purified water to a purified water storage.

2. The system of claim 1, further comprising a controller, the controller comprising:
   an operating conditions module configured to interpret at least one operating condition selected from the set of conditions consisting of a waste fluid stream impurity concentration, a waste fluid stream flow rate, a steam inlet temperature, a recirculation stream flow rate corresponding to the at least one separation unit, a recirculation stream temperature corresponding to the at least one separation unit, a purified product stream flow rate, a purified product stream impurity concentration, and a purge stream concentration corresponding to the at least one separation unit;
   a user request module configured to interpret at least one user request selected from the set of user requests consisting of a purified product stream flow rate request, a purified product stream impurity concentration request, an inlet steam flow rate request, a purge stream concentration request corresponding to the at least one separation unit, a waste fluid stream flow rate request, a steam stripper reflux ratio request, a purge stream temperature request corresponding to the at least one separation unit, a purified water storage level request, a waste water storage level request, an evaporation unit fluid level request, a system pressure parameter, and a stripping vessel fluid level request;
   a process control module configured to generate at least one system response based on the at least one operating condition, in response to the at least one user request; and
   an actuation module configured to control at least one actuator based on the system response.

3. The system of claim 2, wherein the at least one system response comprises a system response selected from the group consisting of a purge stream valve position, a recirculation stream valve position, a steam inlet valve position, a recirculation pump power output, a final product stream valve position, a reflux valve position, a waste fluid stream valve position, a feed pump power output, a stripper recycle pump power output, and a pre-heated feed stream valve position.

4. The system of claim 2, wherein the controller is distributed over a plurality of computers, and wherein the plurality of computers communicate over a network.

5. The system of claim 2, wherein the user request module interprets the at least one user request by receiving the at least one user request over a network.

6. The system of claim 2, wherein the controller further comprises a monitoring module configured to provide one of the at least one operating conditions to a user display.

7. The system of claim 1, wherein the system to provide waste water purification services is configured with a single inlet connection for waste water and a single outlet connection for purified water.

8. The system of claim 1, wherein the system to provide waste water purification services is configured to fit on a single standard commercial vehicle.

9. The system of claim 1, wherein the mechanical vapor recompression separator, the steam stripper and the secondary recovery heat exchanger comprise modules configured to assemble together, and wherein each of the modules is configured to fit on a single standard commercial vehicle.

10. The system of claim 1, further comprising a waste water storage and a purified water storage.

11. The system of claim 10, further comprising an application utilizing water from the purified water storage, and disposing of the utilized water into the waste water storage.

12. The system of claim 1, wherein each separation system comprises at least two mechanical vapor recompression separators arranged in a series configuration.

13. The system of claim 1, wherein each separation system comprises at least two mechanical vapor recompression separators arranged in a parallel configuration.

14. The system of claim 1, wherein each separation system comprises at least two mechanical vapor recompression separators, the system being configured to automatically switch between operation in a first mode and a second mode, the first mode comprising operation of the at least two mechanical vapor recompression separators in a series configuration and the second mode comprising operation of the at least two mechanical vapor recompression separators in a parallel configuration.

15. A method to provide waste water purification services, the method comprising:
    receiving a waste water stream from a waste water storage;
    separating impurities from the waste water stream in at least one separation unit, each separation unit comprising a mechanical vapor recompression separator, a steam stripper, a primary heat exchanger, and a secondary recovery heat exchanger;
    transferring heat from an evaporation stream to a recirculation stream, the evaporation stream being supplied by the mechanical vapor recompression separator, and the recirculation stream comprising a combination of the waste water stream and a concentrated liquid bottoms stream from the mechanical vapor recompression separator; and
    returning a purified water stream to a purified water storage.

16. The method of claim 15, further comprising:
    interpreting at least one operating condition selected from the set of conditions consisting of a waste fluid stream impurity concentration, a waste fluid stream flow rate, a steam inlet temperature, a recirculation stream flow rate corresponding to the at least one separation unit, a recirculation stream temperature corresponding to the at least one separation unit, a purified product stream flow rate, a purified product stream impurity concentration, and a purge stream concentration corresponding to the at least one separation unit;
    interpreting at least one user request selected from the set of user requests consisting of a purified product stream flow rate request, a purified product stream impurity concentration request, an inlet steam flow rate request, a purge stream concentration request corresponding to the at least one separation unit, a waste fluid stream flow rate request, a steam stripper reflux ratio request, a purge stream temperature request corresponding to the at least one separation unit, a purified water storage level request, a waste water storage level request, an evaporation unit fluid level request, a system pressure parameter, and a stripping vessel fluid level request;
    generating at least one system response based on the at least one operating condition, in response to the at least one user request; and
    controlling at least one actuator based on the system response.

17. The method of claim 16, wherein the at least one system response is selected from the group consisting of a purge stream valve position, a recirculation stream valve position, a steam inlet valve position, a recirculation pump power output, a final product stream valve position, a reflux valve position, a waste fluid stream valve position, a feed pump power output, a stripper recycle pump power output, and a pre-heated feed stream valve position.

18. The method of claim 16, wherein the at least one user request is received over a network.

19. The method of claim 16, wherein the at least one actuator is controlled over a network.

20. The method of claim 16, further comprising providing the at least one operating condition to a user display.

21. The method of claim 15, further comprising:
    using water from the purified water storage in an application and disposing of water from an application into the waste water storage.

* * * * *

UNITED STATES PATENT AND TRADEMARK OFFICE
CERTIFICATE OF CORRECTION

| | |
|---|---|
| PATENT NO. | : 7,842,121 B2 |
| APPLICATION NO. | : 12/199779 |
| DATED | : November 30, 2010 |
| INVENTOR(S) | : Larry D. Sanderson et al. |

It is certified that error appears in the above-identified patent and that said Letters Patent is hereby corrected as shown below:

Column 1, Line 30
 "cannot simply dumped" should read "cannot simply be dumped"

Column 4, Line 57
 "on a singe standard" should read "on a single standard"

Column 14, Line 57
 "suspension Some solids" should read "suspension some solids"

Signed and Sealed this
Eighth Day of March, 2011

David J. Kappos
*Director of the United States Patent and Trademark Office*